(No Model.)

G. F. SIMONDS.
SHELL AND METHOD OF MAKING THE SAME.

No. 348,788. Patented Sept. 7, 1886.

Witnesses
G. A. Taubenschmidt
Frank W. Pickell

Inventor
Geo. F. Simonds
By his Attorney
R. K. Evans

UNITED STATES PATENT OFFICE.

GEORGE F. SIMONDS, OF FITCHBURG, MASSACHUSETTS.

SHELL AND METHOD OF MAKING THE SAME.

SPECIFICATION forming part of Letters Patent No. 348,788, dated September 7, 1886.

Application filed April 8, 1886. Serial No. 198,252. (No model.)

*To all whom it may concern:*

Be it known that I, GEORGE F. SIMONDS, of Fitchburg, in the county of Worcester and State of Massachusetts, have invented a new and Improved Hollow Projectile or Shell for Great Guns and other Fire-Arms; and I hereby declare the following to be a full, clear, and exact description of the same, reference being had to the accompanying drawings, making part of this specification, in which—

Figure 1:
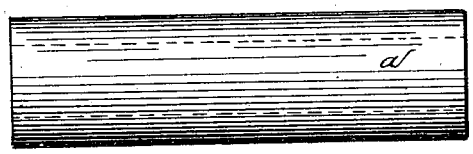
Figure 5:
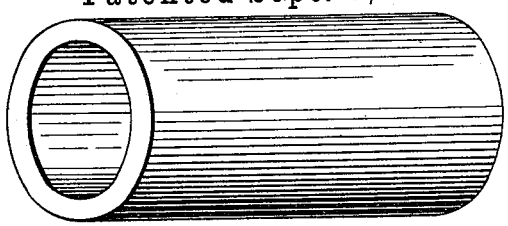
Figure 2:
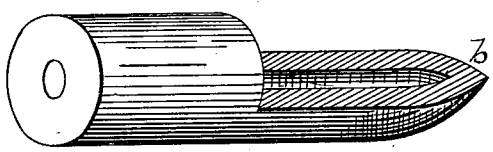
Figure 6:
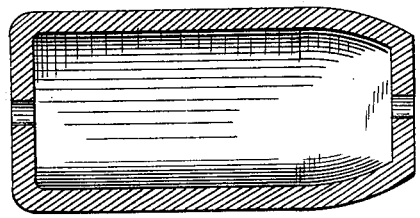
Figure 3:
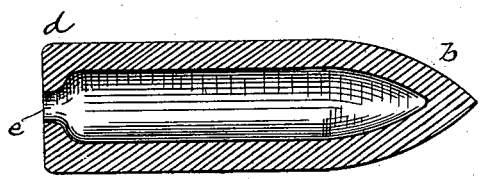
Figure 7:
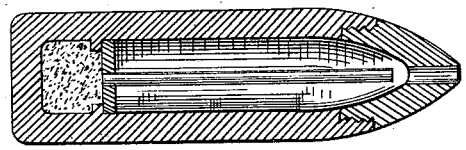
Figure 4:
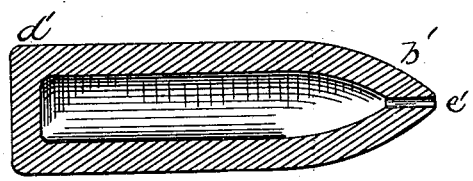
Figure 8:
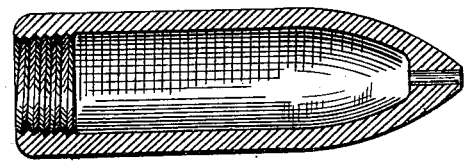

Figure 1 is a side elevation of the tubular or cylindrical blank to be used in making my improved shot or projectile. Fig. 2 is a perspective view of the projectile partially in section. Fig. 3 is a longitudinal sectional view of the same, with the charging-hole in the base of the projectile. Fig. 4 is a longitudinal sectional view showing the charging opening in the point. Fig. 5 is a perspective view of a shell-blank. Fig. 6 is a shell made from said blank. Figs. 7 and 8 illustrate shrapnel-shells according to my invention.

My invention relates to hollow projectiles, especially those designed for great guns; and it consists in a shell or projectile made from a tubular blank and brought to shape by means of dies, such as are shown and described in my application for a patent filed March 24, 1885, Serial No. 160,016, the method therein employed being also the method employed to produce the shell described in this application.

In order that those skilled in the art may make and use my invention, I will proceed to describe the manner in which I have carried it out.

I take a tubular blank, *a*, Fig. 1, and, after properly heating it, pass it between dies, as described in my application hereinbefore mentioned, and close down one end, *b*, and weld it together so as to form a point, and simultaneously therewith break down the base, *d*, in the manner shown in Fig. 3, leaving a small charging-opening, *e*. This opening *e* also affords means for inserting a fuse.

When it is desired that the shell shall be a percussion-shell, the base *d'* (see Fig. 4) is closed down entirely and welded, while the point *b'* has an opening, *e'*, left in it, so that the charge may be inserted and a percussion-fuse placed after the manner usual with percussion-shells.

Figs. 5 and 6 show a modification of my invention when the shell is formed especially adapted for destruction by the contained explosive charge, no especial provision being made for penetration.

I show in Figs. 7 and 8 a further modification, adapted to be used as shrapnel, and provision made for an opening in the base or point of the projectile sufficiently large to enable the placing of the shrapnel charge within the shell.

I am aware that heretofore solid and hollow projectiles have been made into form by casting, drop-forging, and ways otherwise than by rolling, and after being formed were subjected to a rolling operation to condense and harden the metal, while my invention provides a projectile which is, by a rolling operation, simultaneously brought to form and condensed and hardened, such simultaneous operation being distinguishable in the projectile by the forging-lines on the surface being spiral to the axis of the projectile, while the hardening and finishing lines are at right angles to the said axis.

Having thus described my invention, what I claim as new, and desire to secure by Letters Patent, is—

1. A hollow projectile rolled to form and the metal condensed and hardened all at one operation, substantially as set forth.

2. The method of making a hollow projectile or similar structure, consisting in rolling a tubular blank, thereby drawing one end together to form the forward end of the projectile and thickening and condensing the walls of the projectile at the same time, substantially as described.

GEO. F. SIMONDS.

Witnesses:
G. E. DOWNE,
H. S. DOWNE.